Dec. 30, 1952     H. N. GIRARDIN     2,623,271
CUTOFF TOOL HOLDER
Filed Oct. 10, 1950

INVENTOR.
HOWARD N. GIRARDIN,
BY
Wisner & Sloman
ATTORNEYS.

Patented Dec. 30, 1952

2,623,271

UNITED STATES PATENT OFFICE 2,623,271

CUTOFF TOOL HOLDER

Howard N. Girardin, Grosse Pointe, Mich., assignor to George H. Shephard, Lake Worth, Fla.

Application October 10, 1950, Serial No. 189,394

3 Claims. (Cl. 29—96)

1

This invention relates to a cut-off tool holder, and more particularly to a tool holder adapted for a machine tool for effectively securing a cutoff tool therein.

It is the object of the present invention to provide a cut-off tool holder which supports a cutoff blade in a novel and unusual manner and which effectively secures the same within the holder.

It is the further object of this invention to provide a simplified cut-off tool holder wherein holding pressure is exerted upon the top and bottom longitudinal edges of the tool as well as upon the opposite side edges thereof throughout a substantial portion of its length.

These and other objects will be seen from the following specification and claims in conjunction with the appended drawing in which—

It will be understood that the above drawing illustrates merely a preferred embodiment of the invention and that other embodiments are contemplated within the scope of the claims hereafter set out.

Figure 1:
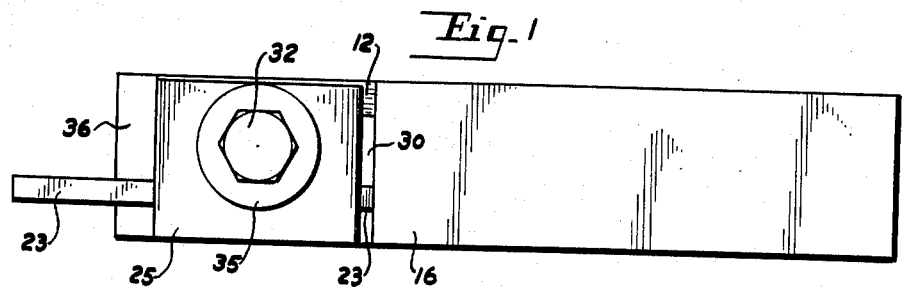
Fig. 1 is a plan view of the tool holder.
Figure 2:
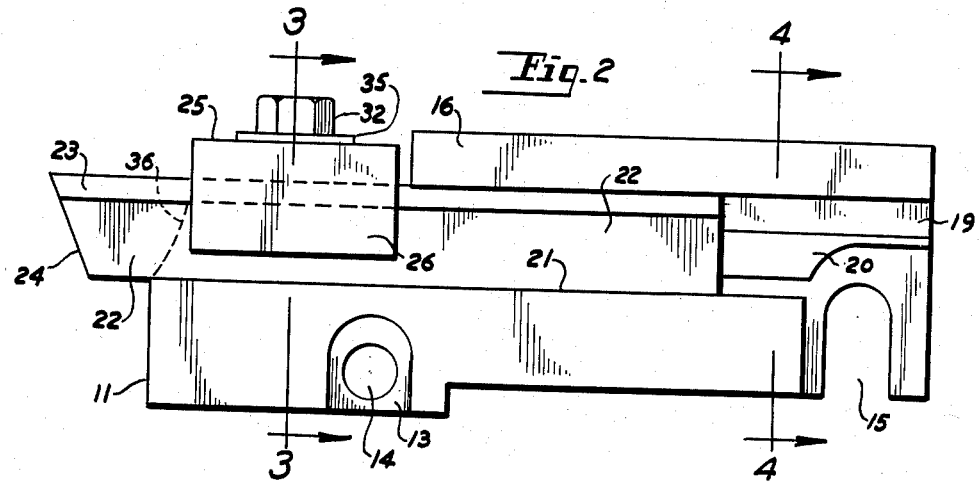
Fig. 2 is a side elevational view thereof.

Referring to the drawing the cut-off tool holder consists of an elongated supporting block 11 of substantial rectangular cross section. The one end of said block is partially cut away as shown in Figs. 1 and 2 to provide the clamp anvil 30 which has formed upon one side in its upper surface the angular or tapered longitudinal portion 12. The block is adapted for mounting at the proper place within a machine tool and is provided on one side with a countersunk opening 13 and the transverse circular opening 14 whereby the block may be effectively secured to the machine tool in the desired position.

Referring to Fig. 2 the block 11 has an undercut transverse slot 15 which forms no part of the present invention but provides additional means whereby the tool holder may be adjustably secured within a machine tool. The block 11 has the forward horizontally cut away portion defining the anvil surface 30, whereas the shank 16 of the block extends rearwardly of said anvil and has an increased height.

The cut off tool is positioned within the lateral slot in the shank and the forward end of the tool is gripped by a clamping plate 25 hereafter described which is secured to the anvil 30 and which bears down upon the top edge of the cutting tool 22 in a manner hereafter more fully described.

2

For this purpose the block and the shank 16 have an elongated lateral undercut slot 17 including the longitudinal top wall 18, the upright inner side wall 19 from which laterally projects the longitudinal flange 20, and the horizontal longitudinally extending bottom surface 21.

Figures 3, 4:
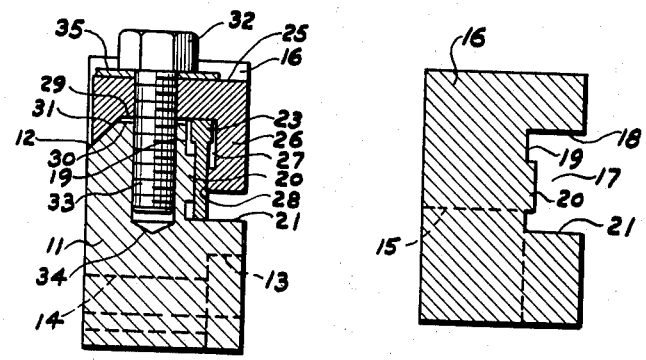
Fig. 3 is a section on line 3—3 of Fig. 2.
Fig. 4 is a section on line 4—4 of Fig. 2.

The aforesaid top surface 18 of slot 17 terminates at the forward end of shank 16, however the inner side wall 19 as well as the longitudinal flange 20 and the bottom tool supporting surface 21 extend forwardly to the front end of the block 11 as illustrated in Figs. 2 and 3.

In use there is employed a cut off tool blade 22, which in the present instance includes a longitudinal upper head portion 23 of increased width, and this blade is positioned within the lateral slot 17 of the block shank and rests upon surface 21 of said slot with the upper longitudinal edge of the cutting blade engaging the under surface 18 of said slot. At the same time the central longitudinal portion of said blade upon its inner side cooperatively bears against the longitudinal flange 20, the said blade at its forward end being angularly formed upwardly and outwardly at 24 as shown in Fig. 2.

The clamping plate 25 is provided for securing the cut off tool in its proper position within the longitudinal lateral slot of the holder block and shank, and includes upon one side the downwardly depending flange 26 having at its lower end an inwardly directed longitudinal flange 28 which is adapted to bear compressively against the outer forward longitudinal surface of the cut off tool blade 22. It will be noted that in view of the flange 20 within slot 17 there is thus provided an enlarged recess 27 which receives the enlarged head 23 of the cut off tool blade. The under surface 29 of clamping plate 25 is spaced from the anvil surface 30 of the block and operatively bears down upon the top longitudinal edge of the cutting blade, it being noted that there is a definite spaced relation provided between the surfaces 29 and 30 to permit adjustment of the plate 25 with respect to the surface 30.

Upon the other side of the clamping plate 25 there is also a longitudinally extending complemental tapered flange 31 which cooperatively bears against the tapered surface 12 in the block, the tapered surface 31 being adapted for sliding engagement upon and with respect to tapered surface 12.

The plate 25 is secured upon the block and over the anvil surface 30 by means of the bolt 32 with threaded depending shank 33 which loosely projects through a corresponding opening in the clamping plate 25 and is projected into the threaded opening 34 formed within the block 11. It will be noted that a suitable washer 35 is interposed between said bolt and the top surface of clamping plate 25.

In operation with the blade 23—22 properly and adjustably inserted and positioned within the lateral slot 17 of the tool holder block, the clamping plate is projected thereover as shown in Figs. 1, 2 and 3 and is tightly secured by manual turning of the bolt 32 by a suitable wrench. It will be seen that in view of the cooperating tapered surfaces 12 and 31 downward tightening movement of the clamp upon the top longitudinal edge of the blade will also cause a lateral movement to the left of the clamping plate in view of said tapered surfaces with the result that the depending and inwardly directed flange 28 of the clamp forcefully and compressively engages the outer surface of the upright blade projecting the same against the interior longitudinal flange 20 within slot 17.

By this construction there is a very rigid locking of the cutting blade for the reason that the same is compressively engaged upon all of its surfaces i. e. the top and bottom edges and both of the opposite sides of said blade, that is at the forward portion thereof covered by the length of the clamping plate 25 and its flange 26.

Thus it is quite apparent that there is provided a fully and completely effective cut off tool holder for rigidly securing the holder clamp 25 with respect to the holder block.

As shown in Figs. 1 and 2 the forward surface of the block 11 has a cut away portion 36 to provide additional clearance.

Having described my invention reference should now be had to the claims which follow for determining the scope thereof.

I claim:

1. A cut off tool holder comprising an elongated block having a lateral longitudinally slotted portion with flat top and bottom walls for engagement with the top and bottom longitudinal edges of a cut off tool, and an upright side wall to engage one side wall of said tool, the forward upper portion of said block being cut away to a point below the top wall of said slotted portion defining a horizontal anvil, the outer top of said anvil having a longitudinally tapered portion, a clamping plate mounted upon the top edge of said tool and having a depending complemental tapered portion slidably engageable with said first tapered portion, and a tool locking means extending through said plate and threadably engaging said block.

2. A cut off tool holder comprising an elongated block having a lateral longitudinally slotted portion with flat top and bottom walls for engagement with the top and bottom longitudinal edges of a cut off tool, the forward upper portion of said block being cut away to a point below the top wall of said slotted portion defining a horizontal anvil, the outer top of said anvil having a longitudinally tapered portion, a clamping plate mounted upon the top edge of said tool and having a depending complemental tapered portion on one side slidably engageable with said first tapered portion and a depending flange upon the other side of said plate with an inwardly directed longitudinal flange at its lower end cooperatively engaging the outer side wall of said tool, and a tool locking means extending through said plate and threadably engaging said block for tightly securing said plate upon said tool.

3. A cut off tool holder comprising an elongated block having a lateral longitudinally slotted portion with flat top and bottom walls for engagement with the top and bottom longitudinal edges of a cut off tool, said block having a longitudinal flange projecting laterally into said slotted portion for engagement with the inner side wall of said tool, the forward upper portion of said block being cut away to a point below the top wall of said slotted portion defining a horizontal anvil, the outer top of said anvil having a longitudinally tapered portion, a clamping plate mounted upon the top edge of said tool and having a depending complemental tapered portion on one side slidably engageable with said first tapered portion and a depending flange upon the other side of said plate with an inwardly directed longitudinal flange at its lower end cooperatively engaging the outer side wall of said tool, and a bolt extending through said plate and threadably engaging said block for tightly securing said plate upon said tool and for tightly projecting said inwardly directed longitudinal flange of said said clamping plate against the outer side wall of said tool.

HOWARD N. GIRARDIN.

REFERENCES CITED

The following references are of record in the file of this patent:

UNITED STATES PATENTS

| Number | Name | Date |
|---|---|---|
| 2,225,327 | Walker | Dec. 17, 1940 |

FOREIGN PATENTS

| Number | Country | Date |
|---|---|---|
| 145,738 | Switzerland | May 16, 1931 |